(12) United States Patent
Fredrickson et al.

(10) Patent No.: US 12,184,671 B2
(45) Date of Patent: Dec. 31, 2024

(54) SOUND-BASED PRESENTATION ATTACK DETECTION

(71) Applicant: INTERNATIONAL BUSINESS MACHINES CORPORATION, Armonk, NY (US)

(72) Inventors: Mark S. Fredrickson, Rochester, MN (US); Chad Albertson, Rochester, MN (US); David Grant Wheeler, Rochester, MN (US); Scott D. Frei, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 17/656,658

(22) Filed: Mar. 28, 2022

(65) Prior Publication Data

US 2023/0308457 A1    Sep. 28, 2023

(51) Int. Cl.
*H04L 9/40*         (2022.01)
*G06V 10/42*        (2022.01)
*G06V 40/16*        (2022.01)
*H04L 12/18*        (2006.01)

(52) U.S. Cl.
CPC .......... *H04L 63/1416* (2013.01); *G06V 10/42* (2022.01); *G06V 40/166* (2022.01); *H04L 12/1831* (2013.01)

(58) Field of Classification Search
CPC . H04L 63/1416; H04L 12/1831; G06V 10/42; G06V 40/166; G06V 20/40; G06V 20/52; G06V 40/20
See application file for complete search history.

(56) References Cited

U.S. PATENT DOCUMENTS

| 10,430,652 | B2 | 10/2019 | Gacon |
| 10,922,438 | B2 | 2/2021 | Frederick |
| 10,984,270 | B2 | 4/2021 | Storm |
| 10,990,808 | B2 | 4/2021 | Hua |
| 2012/0327180 | A1 | 12/2012 | Thorson |

(Continued)

OTHER PUBLICATIONS

"Cognitive Services pricing—Face API" Article dated Jan. 26, 2021 as verified by Internet Archive (7 pages) (Year: 2021).*

(Continued)

*Primary Examiner* — Joseph P Hirl
*Assistant Examiner* — Thomas A Gyorfi
(74) *Attorney, Agent, or Firm* — Stosch Sabo (57) ABSTRACT

Described are techniques for presentation attack detection including a computer-implemented method of emitting a predetermined frequency pattern using at least one speaker communicatively coupled to a computer implementing a video-conference. The computer-implemented method further comprises collecting, by a camera communicatively coupled to the computer and overlapping with the emitting the predetermined frequency pattern, video data of a user engaged in the video-conference. The computer-implemented method further comprises determining that the video data is inconsistent with an expected response to the predetermined frequency pattern. The computer-implemented method further comprises generating an indication that the user engaged in the video-conference is performing a presentation attack.

14 Claims, 7 Drawing Sheets

(56) References Cited

U.S. PATENT DOCUMENTS

| | | | |
|---|---|---|---|
| 2014/0325682 A1 | 10/2014 | Turgeman | |
| 2016/0350611 A1 | 12/2016 | Zhang | |
| 2016/0371555 A1 | 12/2016 | Derakhshani | |
| 2017/0220786 A1 | 8/2017 | Guo | |
| 2018/0046871 A1* | 2/2018 | Ionita | G06V 40/172 |
| 2018/0232511 A1 | 8/2018 | Bakish | |
| 2018/0337917 A1 | 11/2018 | Wallace | |
| 2019/0377963 A1* | 12/2019 | Hamid | G06V 40/45 |
| 2021/0059472 A1 | 3/2021 | Shei | |
| 2021/0097160 A1 | 4/2021 | Yang | |
| 2021/0117529 A1 | 4/2021 | Zamora Martínez | |
| 2021/0176429 A1 | 6/2021 | Peters | |
| 2021/0279472 A1 | 9/2021 | Chuang | |

OTHER PUBLICATIONS

"Face Liveness Detection and Biometric Anti-Spoofing 2022", Downloaded Jan. 21, 2022, 11 Pgs, <https://www.bioid.com/liveness-detection/>.

"Online Browsing Platform (OBP)" ISO/IEC 30107-3:2017, Information Technology—Biometric Presentation Attack Det Reporting, Downloaded Jan. 25, 2022, 1 Pg.

Bao et al., "A Liveness Detection Method for Face Recognition Based on Optical Flow Field", Downloaded on Jan. 21, 2022, 1 Pg., 978-1-4244-398607/09/© 2009 IEEE, <https://ieeexplore.ieee.org/stamp/stamp.jsp?tp . . . >.

Bharadwaj et al., "Face Anti-Spoofing via Motion Magnification And Multifeature Videolet Aggregation", 12 Pgs, Downloaded Jan. 25, 2022.

Freeman, "Eulerian Video Magnification: Engineerng Applications of a V1-Like Image Representation", You Tube Mar. 25, 2016, 3 Pgs., <https://www.youtube.com/watch?v==2XBQ_1t8SiQ>.

Gonzales et al., "Extracting Physiological Information in Experimental Biology via Eulerian Video Magnification", BMc bIOL 17, 103, Dec. 12, 2019, 85 Pgs, <https://bmcbiol.biomedcentral.com/articles/10 . . . >.

Hardesty, "Extracting Audio From Visual Information", MIT News on Campus and Around the World, Aug. 4, 2014, 11 Pgs, <https://news.mit.edu/2014/algorithm-recovers-s . . . >.

Huang et al., "BreathLive: Liveness Detection For Heart Sound Authentication With Deep Breathing", Hong Kong University of Science and Technology, 25 Pgs, Mar. 2018, ,https://doi.org/10.1145/391744>.

Ibeta—Software Testing for the World's Most Trusted Brands, Downloaded Jan. 25, 2022, 8 Pgs., <https://www.ibeta.com/>.

IDR&D - "IDLive® Face Passive Facial Liveness Detection", Downloaded Jan. 21, 2022, 12 Pgs, <https"www.idrnd.ai/passive-facial-liveness/>.

Liu et al., Livescreen: Video Chat Liveness Detection Leveraging Skin Reflection, NSF Public Access Repository (NSF-PAR), National Science Foundation, Jul. 1, 2020, NSF-PAR ID: 10185968, IEEE Infocome 2020—IEEE Conference on Computer Communications, 1 Pg. <https://doi.org/10.1109/INFOCOM41043.2020.9155400 & https://par.nsf.gov/biblio/10185968-livescreen>.

liveness.com—"Biometric Liveness Deetection Explained", Downloaded Jan. 20, 2022, 13 Pgs, <https://liveness.com/>.

Massachusetts Institute of Technology (MIT).,"Magnifying Motion—You Tube", 3 Pgs, Apr. 23, 2015, <https://www.youtube.com/watch?v=MYp298fhlzk>.

Mell et al., "The NIST Definition of Cloud Computing", National Institute of Standards and Technology, Special Publication 800-145, Sep. 2011, 7 pages.

MIT "Video Magnification" Csail, Downloaded Jan. 25, 2022, 4 Pgs, <http/people.csail.mit.edu/mrub/vidmag/>.

Pinto et al., "Using Visual Rhythms for Detecting Video-Based Facial Spoof Attacks", IEEE Transactions on Information Forensics and Security, vol. 10, No. 5, May 2015, 14 Pgs, 1556-6013© 2015 IEEE.

Rubinstein., "Eulerian Video Magnification", YouTube, May 23, 2012, 4 Pgs, <https://www.YouTube.com/watch?v ==ONZcjs1Pjmk>.

Shang et al., "Protecting Real-Time Video Chat Against Fake Facial Videos Generated By Face Reenactment", Center for Networked Computing, Temple University, Philadelphia, PA 19121, 11 Pgs, Downloaded Jan. 25, 2022.

Siddiqui et al., "Face Anti-Spoofing With Multifeature Videolet Aggregation", 2016 23rd International Conference on Pattern Recognition (ICPR) Cancun Center, Cancun, Mexico, Dec. 4-8, 2016, 6 Pgs, 978-1-5090-4846-5/16/© 2016 IEEE.

Wen et al., "Face Spoof Detection With Image Distortion Analysis", Researchgate, IEEE Transactions on Information Forensics and Security—Apr. 2015, DOI: 10.1109/TIFS.2015.2400395, 17 Pgs. <https://www.researchgate.net/publications/271269865>.

Woollacott., raconteur.net, "Deepfaking It: the New Cybersecurity Frontier", Raconteur. Net,Feb. 17, 2021, 8 Pgs, ,https://www.raconteur.net/technology/cybersecurity frontier>.

Zhou et al., "Securing Face Liveness Detection Using Unforgetable Lip Motion Patterns", arXiv:2106.08013v1 [cs.CR] Jun. 15, 2021, 15 Pgs.

Notification of Transmittal of the International Search Report and the Written Opinion of the International Searching Authority, or the Declaration for Application PCT/CN2023/083382, Jul. 3, 2023, 8 pages.

* cited by examiner

SOUND-BASED PRESENTATION ATTACK DETECTION

BACKGROUND

The present disclosure relates to cybersecurity, and, more specifically, to sound-based presentation attack detection.

Presentation attacks are implemented by malicious actors pretending to be another individual to engage in malicious behavior such as providing credible but misleading information, fraudulently authorizing a transfer of money, goods, or services, or otherwise utilizing false user authentication to achieve malicious outcomes. Presentation attacks can be implemented by, for example, masks, photographs, pre-recorded videos, live deep-fake videos, and the like.

SUMMARY

Aspects of the present disclosure are directed toward a computer-implemented method comprising emitting a predetermined frequency pattern using at least one speaker communicatively coupled to a computer implementing a video-conference. The computer-implemented method further comprises collecting, by a camera communicatively coupled to the computer and overlapping with the emitting the predetermined frequency pattern, video data of a user engaged in the video-conference. The computer-implemented method further comprises determining that the video data is inconsistent with an expected response to the predetermined frequency pattern. The computer-implemented method further comprises generating an indication that the user engaged in the video-conference is performing a presentation attack.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward cybersecurity, and, more specifically, to sound-based presentation attack detection. While not limited to such applications, embodiments of the present disclosure may be better understood in light of the aforementioned context.

Presentation attack detection (also referred to as spoof detection or liveness detection) can be used to detect presentation attacks by various methods. Presentation attack detection methods can rely on factors such as blink detection, eye movement, pupil dilation, biometric factors (e.g., breathing, body temperature, blood flow, blood pressure, etc.), interactive user queries, light reflectivity, three-dimensional cameras for depth-based assessments, infrared cameras for thermal pattern detection, optical flow fields, background noise analysis, and the like. Presentation attack detection methods can be active or passive based on whether or not the person being authenticated needs to perform any special action to prove authenticity. Presentation attack detection methods can utilize various types of hardware such as, but not limited to, video cameras, single frame cameras, thermal imaging cameras, cameras capable of three-dimensional (3D) depth perception, speakers, headphones, ear buds, and the like. Presentation attack detection methods are standardized in the International Organization of Standardization/International Electrotechnical Commission (ISO/IEC) 30107-3 which includes principles and methods for performance assessment of presentation attack detection mechanisms, reporting of testing results from evaluations of presentation attack detection mechanisms, and a classification of known attack types.

Aspects of the present disclosure are directed toward techniques for presentation attack detection. One aspect of the present disclosure is a passive presentation attack detection mechanism whereby a predetermined frequency pattern is emitted from one or more speakers and high-resolution, high-speed cameras capture induced vibrations caused by the predetermined frequency pattern. The predetermined frequency pattern can cause vibrations on clothing filaments and/or hairs of an authentic user engaged in a video-conference, where such vibrations would not be induced on an individual performing a presentation attack. Advantageously, this aspect of the present disclosure is capable of differentiating authentic users from malicious users using presentation attacks for most known presentation attack vectors. Furthermore, this aspect of the present disclosure is a passive presentation attack detection mechanism that can be utilized without requiring any particular action to be performed by the user engaged in the video-conference.

Another aspect of the present disclosure is an active presentation attack detection mechanism whereby a predetermined frequency pattern is emitted from one or more speakers and a video camera captures user movements and/or facial expressions reacting to the predetermined frequency pattern. Expected user movements and/or expected changes in facial expression can indicate an authentic user, whereas unexpected movements and/or unexpected changes in facial expression can indicate a user that is performing a presentation attack. Advantageously, this aspect of the present disclosure does not require any specialized equipment and can be performed using most consumer-level video-conferencing equipment.

Figure 1:
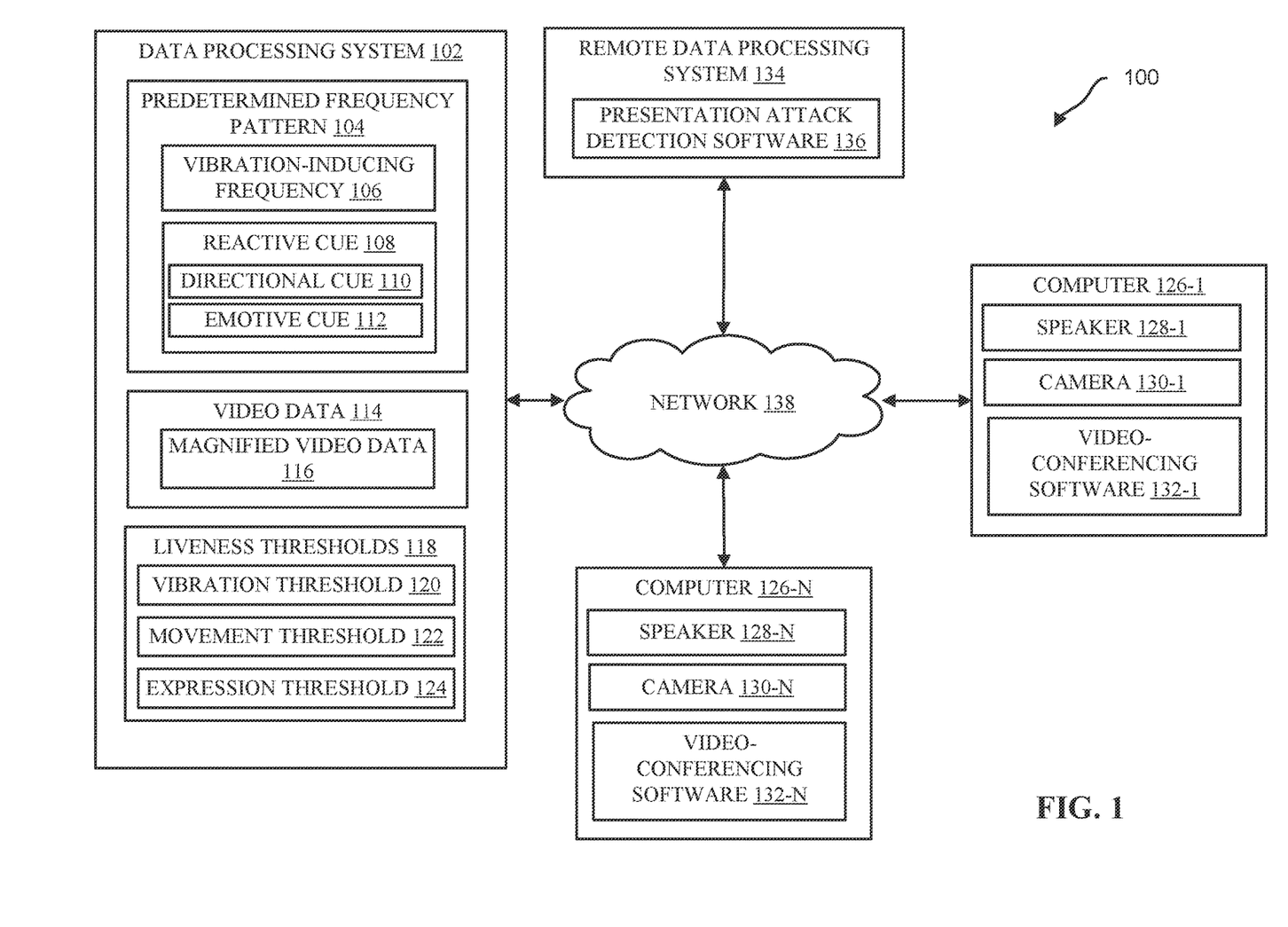
FIG. 1 illustrates a block diagram of an example computational environment deploying presentation attack detection software, in accordance with some embodiments of the present disclosure.

Referring now to the figures, FIG. 1 illustrates a block diagram of an example computational environment 100 deploying presentation attack detection software 136, in accordance with some embodiments of the present disclosure. The computational environment 100 includes a data processing system 102, remote data processing system 134, and a plurality of computers 126 (e.g., first computer 126-1 to $n^{th}$ computer 126-N, where N can refer to any positive integer greater than one) that are communicatively coupled to one another through network 138. The network 138 can refer to any local area network (LAN), wide-area network (WAN), an intranet, the Internet, or any other data processing network useful for connecting two or more computational devices.

Two or more computers 126 can be engaged in a video-conference using video-conferencing software 132 (e.g., a first instantiation of the video conferencing software 132-1 corresponding to the first computer 126-1 and an $n^{th}$ instantiation of the video conferencing software 132-N corresponding to an $n^{th}$ computer 126-N). Each of the computers 126 can include a speaker 128 (e.g., speaker 128-1 corresponding to computer 126-1 and speaker 128-N corresponding to computer 126-N) and a camera 130 (e.g., camera 130-1 corresponding to computer 126-1 and camera 130-N corresponding to computer 126-N). Speaker 128 can be any speaker communicatively coupled to its corresponding computer 126 and capable of emitting audio from the video-conference. Speaker 128 can be incorporated into the computer 126, connected by wire to the computer 126 (e.g., a Universal Serial Bus (USB) connection, an Auxiliary (AUX) input connection, etc.), or wirelessly connected to the computer 126 (e.g., Bluetooth connection). Camera 130 can be any video camera capable of collecting video data 114 of a user associated with the computer 126 and engaged in the video-conference. In some embodiments, camera 130 is a high-speed and/or high-resolution video camera 130. In some embodiments, camera 130 is capable of capturing video, at least temporarily, at frame rates above 500 frames per second (FPS), 700 FPS, 900 FPS, or 1,000 FPS, in various embodiments.

Data processing system 102 can perform presentation attack detection. In some embodiments, data processing system 102 downloads presentation attack detection software 136 from a remote data processing system 134. In some embodiments, the presentation attack detection software 136 is a component of the video-conferencing software 132 (e.g., providing extensible functionality for presentation attack detection to users of the video-conferencing software 132 for verifying the authenticity of other participants in a video-conference), whereas in other embodiments, presentation attack detection software 136 is a standalone software that can be deployed in conjunction with various types of video-conferencing software 132. Although FIG. 1 illustrates data processing system 102 implementing the presentation attack detection software 136 (that may be downloaded from remote data processing system 134), in other embodiments, presentation attack detection software 136 can be downloaded to, and implemented by, computers 126.

The data processing system 102 can be any computer, server, or other data processing system capable of deploying presentation attack detection software 136. In some embodiments, data processing system 102 is a server managed by the video-conferencing software 132 for supporting a video-conference between two or more computers 126. The data processing system 102 includes a predetermined frequency pattern 104. The predetermined frequency pattern 104 can comprise various frequencies (including audible and non-audible frequencies), various volumes, and various durations that are collectively configured to test an authenticity of a user in a video-conference.

For example, the predetermined frequency pattern 104 can be a vibration-inducing frequency 106 and/or a reactive cue 108 such as a directional cue 110 or an emotive cue 112. Vibration-inducing frequency 106 can be a frequency that induces vibrations in small objects such as thread filaments on clothing and/or human hair (e.g., arm hair, facial hair, head hair, etc.). In some embodiments, vibration-inducing frequency 106 is calibrated to induce vibrations that can be captured by a frame rate of the camera 130.

Reactive cue 108 can be audible cues that elicit a response (e.g., body movement or facial expression) from a user engaged in a video-conference. For example, a directional cue 110 can be used to cause a user engaged in a video-conference to react to a perceived directional noise, such as by flinching, turning their head, shifting their eyes, and the like. A directional cue 110 can be, for example, an audible sound that is emitted from only one of multiple speakers 128, thereby giving the directional cue 110 the appearance of direction. Furthermore, the directional cue 110 can be an audible sound likely to elicit a reaction from a person, such as an audible sound mimicking a mosquito or other insect, an error tone, or a voice giving an instruction (e.g., "please look over here").

Another example reactive cue 108 is an emotive cue 112. Emotive cue 112 can be an audible sound intended to elicit a change in facial expression of a user engaged in a video-conference. For example, an emotive cue 112 can be a sound that interrupts the video-conference, a sound that is unpleasant to a user (e.g., a dial tone with static), a sound that is confusing to a user (e.g., a baby crying), an instruction (e.g., "please smile"), or other sounds that would elicit an alteration in facial expression such as annoyance, confusion, or happiness.

Data processing system 102 further collects video data 114. Video data 114 can be data collected from cameras 130, where the video data 114 overlaps with emitting the predetermined frequency pattern 104 from the speakers 128. More specifically, the video data 114 can be initiated prior to emitting the predetermined frequency pattern 104 (to capture a baseline vibration, movement, or expression) and during the emitting the predetermined frequency pattern 104 (to capture alterations to vibration, movement, or expression from the baseline). In some embodiments, the video data 114 also extends past the emitting of the predetermined frequency pattern 104 in order to capture residual reactions from the user to the predetermined frequency pattern 104. In other words, the video data 114 can include video that lasts longer than the predetermined frequency pattern 104.

In some embodiments, the video data 114 includes magnified video data 116. Magnified video data 116 can be a portion of the video data 114 that is magnified to evaluate minor changes, such as induced vibration in thread filaments or hair. In embodiments utilizing magnified video data 116, the cameras 130 capturing the video data 114 can be high-definition cameras.

Data processing system 102 further includes liveness thresholds 118. Liveness thresholds 118 can be used to differentiate an authentic user from a user performing a presentation attack in a video-conference. Liveness thresholds 118 can include vibration threshold 120, movement threshold 122, and/or expression threshold 124. Vibration threshold 120 determines if vibrations induced by the vibration-inducing frequency 106 on thread filaments or hair matches an expected vibration. Vibration threshold 120 can be a minimum vibration frequency (or range of vibration frequencies) which, if exceeded (or falls within a range), results in a determination that the user is authentic and which, if not exceeded (or falls outside of the range), results in a determination that the user is performing a presentation attack.

Movement threshold 122 determines if user movement induced by the directional cue 110 matches an expected movement pattern. Movement threshold 122 can be a minimum movement (or range of movement) threshold which, if exceeded (or falls within a range), results in a determination that the user is authentic and which, if not exceeded (or falls outside of the range), results in a determination that the user is performing a presentation attack. In some embodiments, movement threshold 122 is localized to a specific body part of the user, such as the user's head.

Expression threshold 124 determines if a user expression induced by the emotive cue 112 matches an expected expression. Expression threshold 124 can be a minimum change (or range of changes) in expression which, if exceeded (or falls within a range), results in a determination that the user is authentic and which, if not exceeded (or falls outside of the range), results in a determination that the user is performing a presentation attack.

In some embodiments, only one of the vibration-inducing frequency 106, direction cue 110, and emotive cue 112 are utilized to determine an authenticity of a user. In other embodiments, two or more of the vibration-inducing frequency 106, direction cue 110, and/or emotive cue 112 are used to determine an authenticity of a user. In some embodiments, the presentation attack detection software 136 can be used to authenticate each user engaged in a video-conference, whereas in other embodiments, users can be selectively authenticated (e.g., in response to another user engaged in the video-conference deploying the presentation attack detection software 136).

Figure 2:
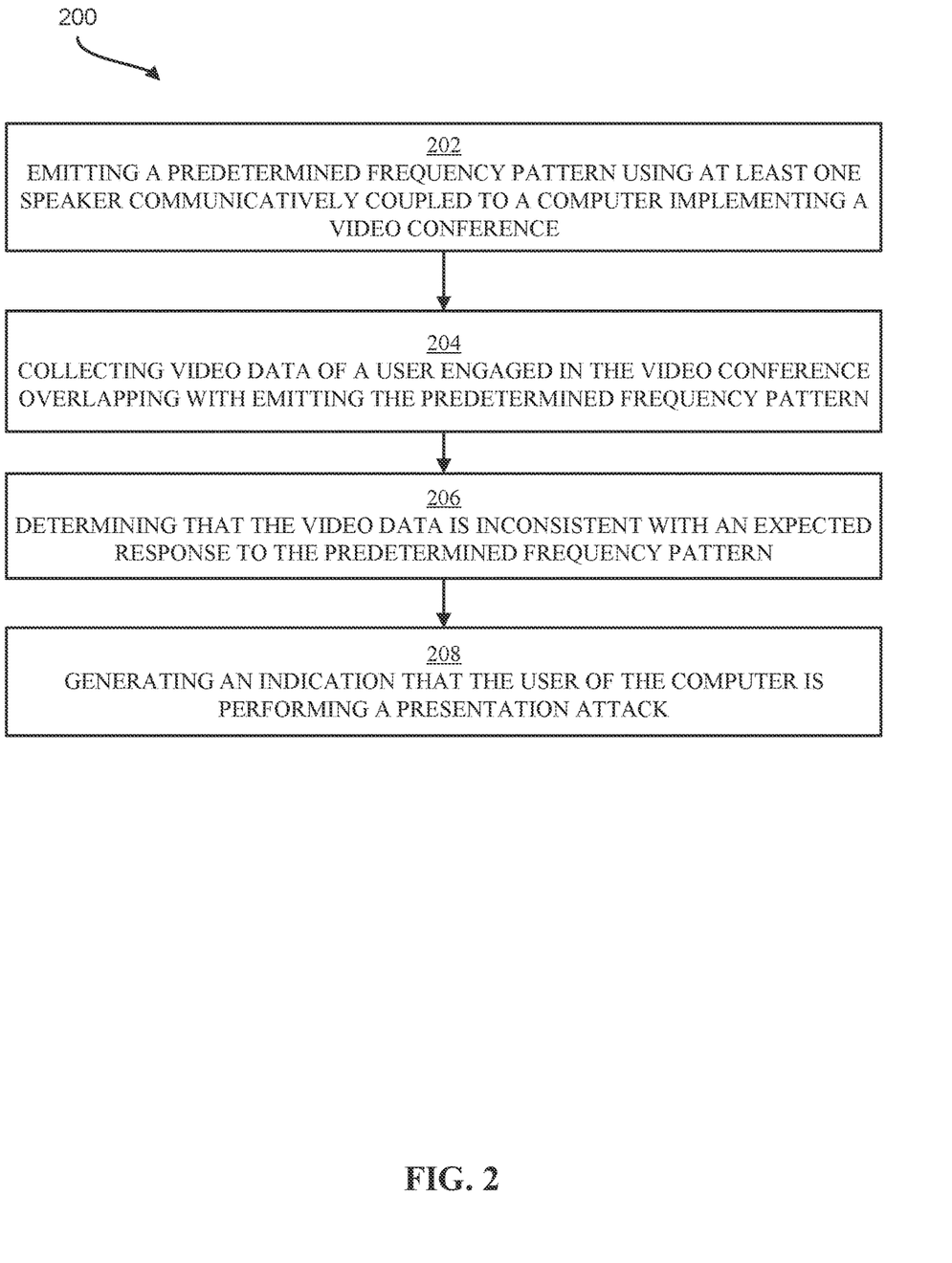
FIG. 2 illustrates a flowchart of an example method for presentation attack detection in video-conferences, in accordance with some embodiments of the present disclosure.

FIG. 2 illustrates a flowchart of an example method 200 for presentation attack detection in video-conferences, in accordance with some embodiments of the present disclosure. In some embodiments, the method 200 is implemented by a data processing system 102, a computer 126, a remote data processing system 134, a processor, or another configuration of hardware and/or software.

Operation 202 includes emitting a predetermined frequency pattern 104 using at least one speaker 128 communicatively coupled to a computer 126 implementing a video-conference. In some embodiments, the predetermined frequency pattern 104 is a vibration-inducing frequency 106 or a reactive cue 108, where the reactive cue 108 can be a directional cue 110 or an emotive cue 112.

Operation 204 includes collecting, by a camera 130 communicatively coupled to the computer 126 and overlapping with the emitting the predetermined frequency pattern 104, video data 114 of a user engaged in the video-conference. In some embodiments, the video data 114 extends for a longer period of time than the predetermined frequency pattern 104. In some embodiments, the video data 114 is high-definition video data with a frame rate of greater than 500 FPS, 700 FPS, 900 FPS, or 1,000 FPS.

Operation 206 includes determining that the video data 114 is inconsistent with an expected response to the predetermined frequency pattern 104. In some embodiments, operation 206 compares the video data 114 to one or more liveness thresholds 118 such a vibration threshold 120, a movement threshold 122, and/or an expression threshold 124 in order to determine whether or not the video data 114 is inconsistent with an expected response to the predetermined frequency pattern 104.

Operation 208 includes generating an indication that the user engaged in the video-conference is performing a presentation attack. Operation 208 can include transmitting the indication to one or more other computers 126 engaged in the video-conference, the data processing system 102, or another entity. In some embodiments, operation 208 performs a mitigating action such as severing a video-conference connection to any computer 126 associated with a user determined to be performing a presentation attack.

Figure 3A:
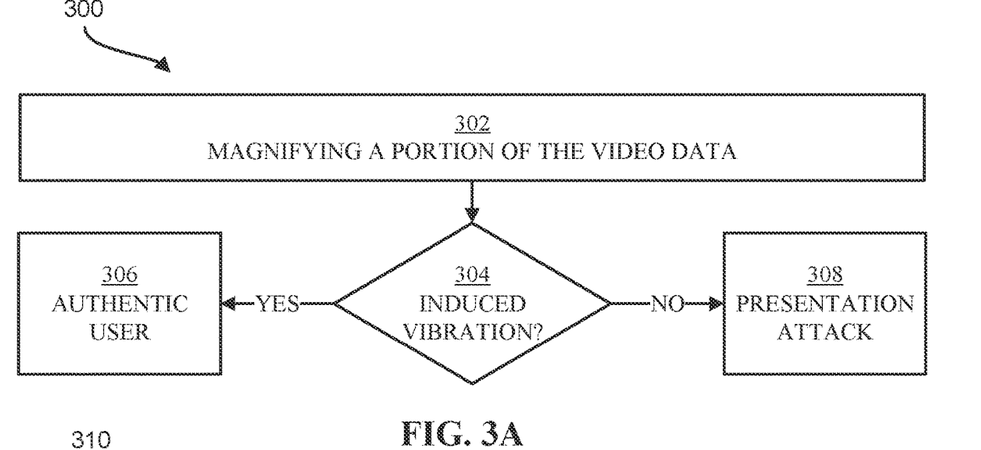
FIG. 3A illustrates a flowchart of an example method for presentation attack detection using induced vibration, in accordance with some embodiments of the present disclosure.

FIG. 3A illustrates a flowchart of an example method 300 for presentation attack detection using induced vibration, in accordance with some embodiments of the present disclosure. In some embodiments, the method 300 is implemented by a data processing system 102, a computer 126, a remote data processing system 134, a processor, or another configuration of hardware and/or software. In some embodiments, the method 300 is a sub-method of operation 206 of FIG. 2.

Operation 302 includes magnifying a portion of the video data 114 to generate magnified video data 116. Magnified video data 116 can be sufficiently magnified to detect vibration in thread filaments and/or hair. Operation 304 determines whether or not there is induced vibration resulting from the vibration-inducing frequency 106 in the magnified video data 116. Operation 304 can use vibration threshold 120 to determine whether or not there is induced vibration. If so (304: YES), then the method 300 proceeds to operation 306 and determines the user to be authentic. If not (304: NO), then the method 300 proceeds to operation 308 and determines that the user is performing a presentation attack.

Figure 3B:
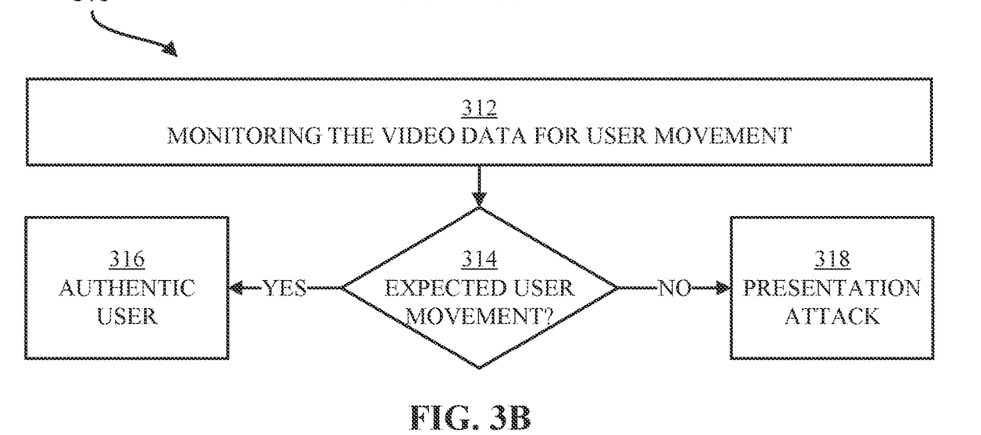
FIG. 3B illustrates a flowchart of an example method for presentation attack detection using user movement, in accordance with some embodiments of the present disclosure.

FIG. 3B illustrates a flowchart of an example method for presentation attack detection using user movement, in accordance with some embodiments of the present disclosure. In some embodiments, the method 310 is implemented by a data processing system 102, a computer 126, a remote data processing system 134, a processor, or another configuration of hardware and/or software. In some embodiments, the method 310 is a sub-method of operation 206 of FIG. 2.

Operation 312 includes monitoring the video data 114 for user movement. In some embodiments, operation 312 monitors the video data 114 during and/or after emitting a directional cue 110 and compares user positions during and/or after emitting the directional cue 110 with user positions prior to emitting the directional cue 110. Operation 314 determines whether or not there was expected user movement as a result of emitting the directional cue 110. Operation 314 can utilize movement threshold 122 to differentiate expected movement from unexpected movement.

If so (314: YES), then the method 310 proceeds to operation 316 and determines that the user is an authentic user. If not (314: NO), then the method 310 proceeds to operation 318 and determines that the user is performing a presentation attack.

Figure 3C:
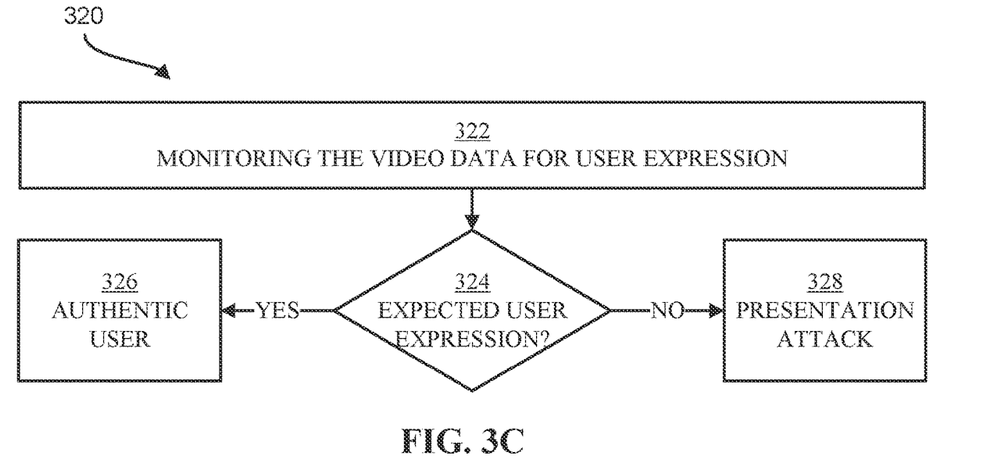
FIG. 3C illustrates a flowchart of an example method for presentation attack detection using user expression, in accordance with some embodiments of the present disclosure.

FIG. 3C illustrates a flowchart of an example method for presentation attack detection using user expression, in accordance with some embodiments of the present disclosure. In some embodiments, the method 320 is implemented by a data processing system 102, a computer 126, a remote data processing system 134, a processor, or another configuration of hardware and/or software. In some embodiments, the method 320 is a sub-method of operation 206 of FIG. 2.

Operation 322 includes monitoring the video data 114 for user expression. In some embodiments, operation 322 monitors the video data 114 during and/or after emitting an emotive cue 112 and compares user expressions during and/or after emitting the emotive cue 112 with user expressions prior to emitting the emotive cue 112. Operation 324 determines whether or not there were expected changes in facial expression as a result of emitting the emotive cue 112. Operation 324 can utilize expression threshold 124 to differentiate expected changes in expression from unexpected changes in expression (or no changes in expression). If so (324: YES), then the method 320 proceeds to operation 326 and determines that the user is an authentic user. If not (324: NO), then the method 320 proceeds to operation 328 and determines that the user is performing a presentation attack.

Figure 4:
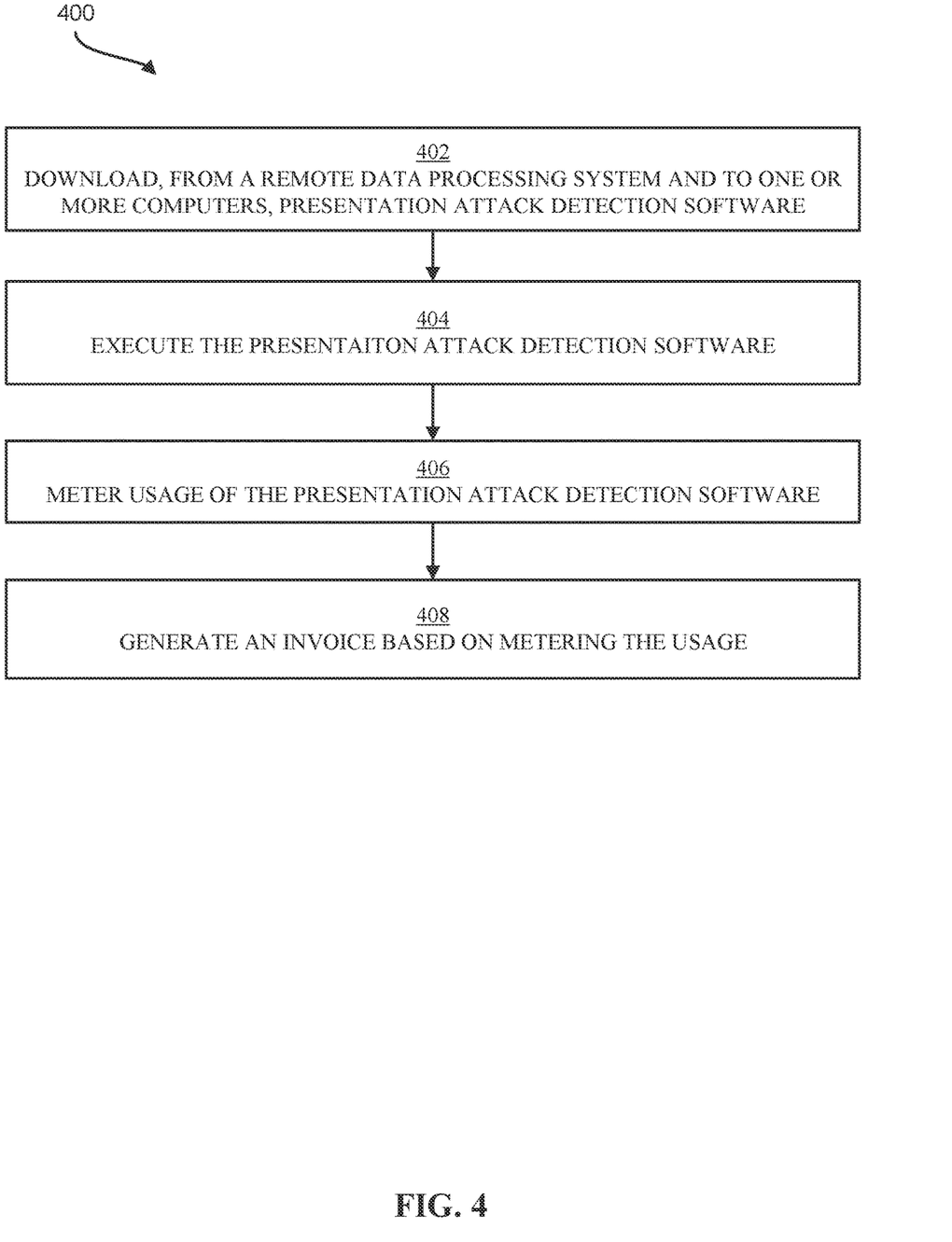
FIG. 4 illustrates a flowchart of an example method for downloading, deploying, metering, and billing usage of presentation attack detection software, in accordance with some embodiments of the present disclosure.

FIG. 4 illustrates a flowchart of an example method 400 for downloading, deploying, metering, and billing usage of presentation attack detection software 136, in accordance with some embodiments of the present disclosure. In some embodiments, the method 400 is implemented by a data processing system 102, a computer 126, a remote data processing system 134, a processor, or another configuration of hardware and/or software. In some embodiments, the method 400 occurs contemporaneously with the other methods discussed in the present disclosure.

Operation 402 includes downloading, from a remote data processing system 134 and to one or more computers (e.g., data processing system 102, computer 126), presentation attack detection software 136. Operation 404 includes executing the presentation attack detection software 136. Operation 404 can include performing any of the methods discussed herein. Operation 406 includes metering usage of the presentation attack detection software 136. Usage can be metered by, for example, an amount of time the presentation attack detection software 136 is used, a number of workstations deploying the presentation attack detection software 136, an amount of resources consumed by implementing the presentation attack detection software 136, and/or other usage metering metrics. Operation 408 includes generating an invoice based on metering the usage.

Figure 5:
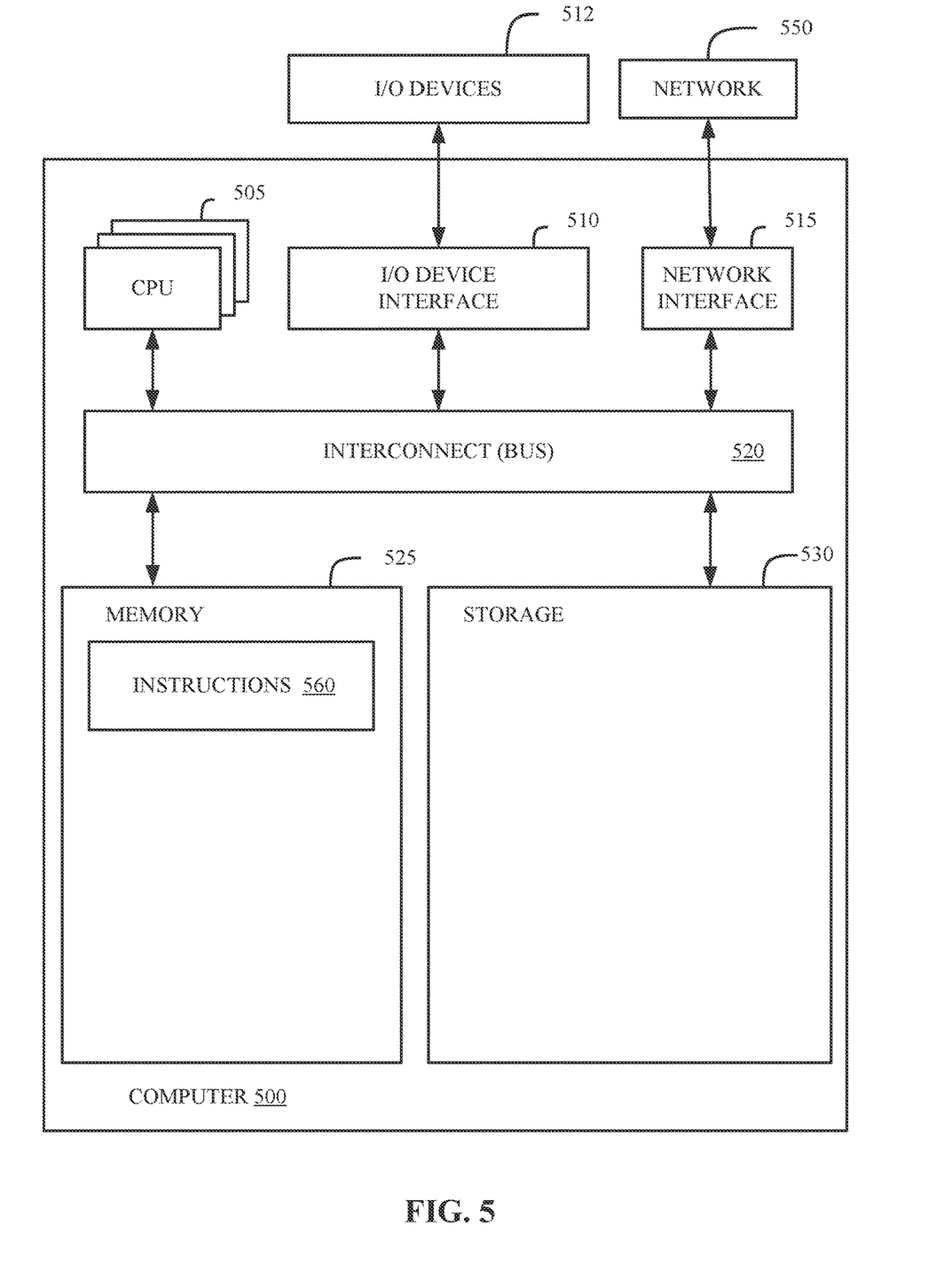
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the methods described in FIGS. 2 and 3A-3C and/or implement the functionality discussed in FIG. 1. In some embodiments, computer 500 receives instructions related to the aforementioned methods and functionalities by downloading processor-executable instructions from a remote data processing system (e.g., remote data processing system 134 of FIG. 1) via network 550. In other embodiments, computer 500 provides instructions for the aforementioned methods and/or functionalities to a client machine (e.g., data processing system 102 and/or computer 126 of FIG. 1) such that the client machine executes the method, or a portion of the method, based on the instructions provided by computer 500. In some embodiments, the computer 500 is incorporated into (or functionality similar to computer 500 is virtually provisioned to) one or more entities illustrated in FIG. 1 and/or other aspects of the present disclosure (e.g., remote data processing system 134, data processing system 102, and/or computer 126).

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the methods of FIGS. 2 and/or 3A-3B and/or implement the functionality discussed in FIG. 1. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
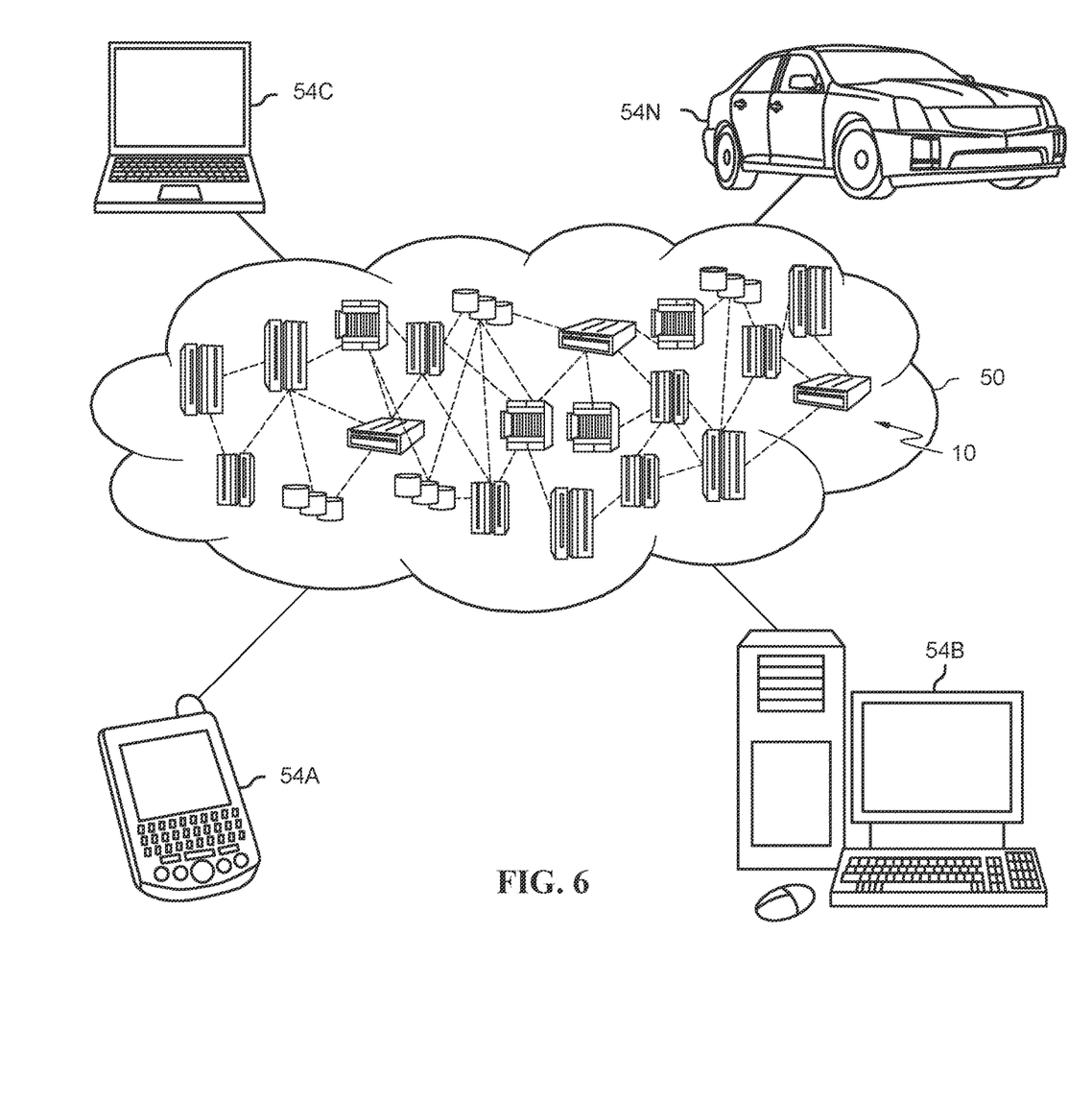
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
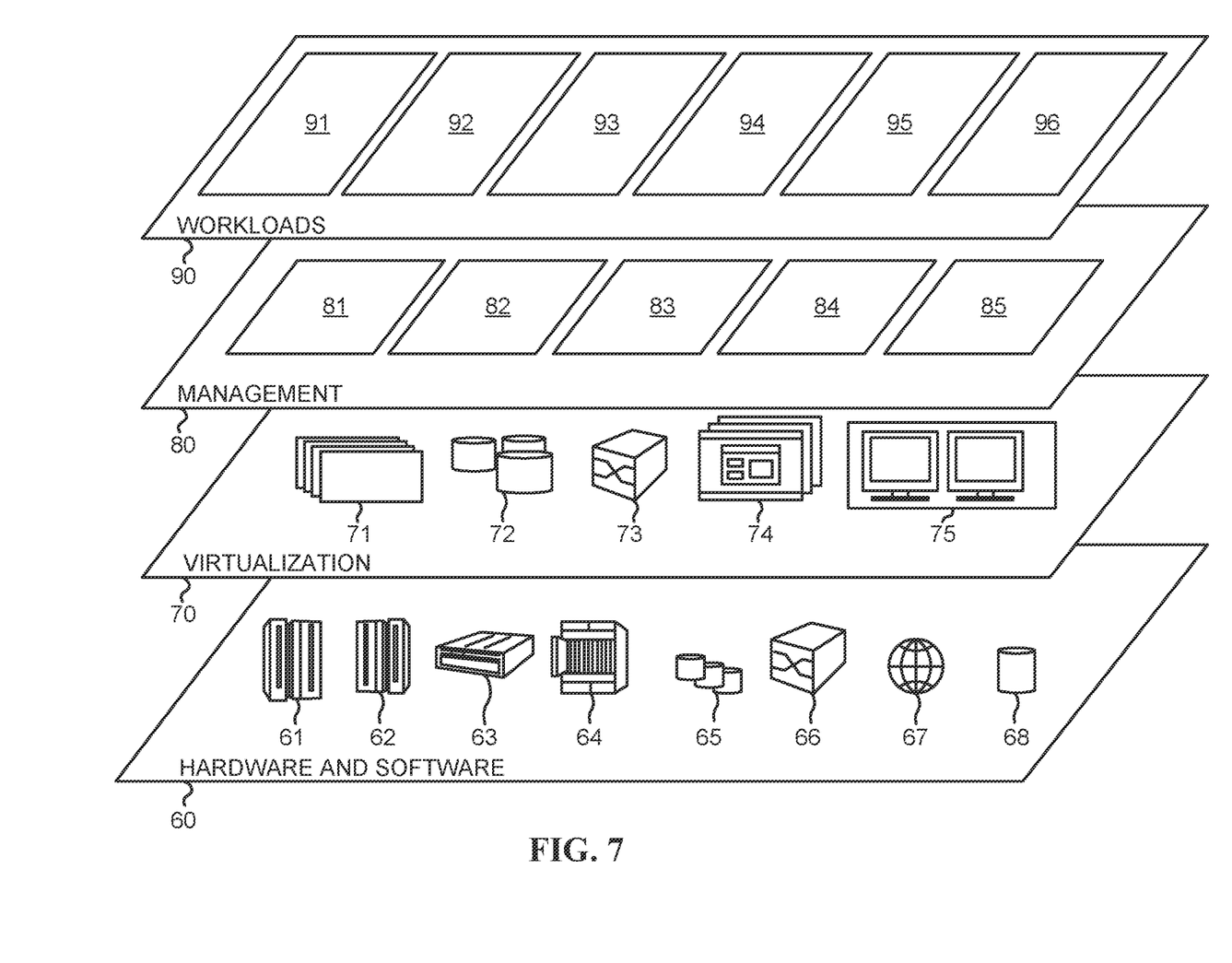
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and presentation attack detection 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the methods described with respect to FIGS. 2 and/or 3A-3B and/or implement the functionality discussed in FIG. 1 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method comprises emitting a predetermined frequency pattern using at least one speaker communicatively coupled to a computer implementing a video-conference; collecting, by a camera communicatively coupled to the computer and overlapping with the emitting the predetermined frequency pattern, video data of a user engaged in the video-conference; determining that the video data is inconsistent with an expected response to the predetermined frequency pattern; and generating an indication that the user engaged in the video-conference is performing a presentation attack.

Example 2 includes the features of Example 1. In this example, determining that the video data is inconsistent with the expected response to the predetermined frequency pattern further comprises: magnifying a portion of the video data; and detecting a lack of vibrational movement in the magnified portion of the video data.

Example 3 includes the features of any one of the Examples 1 to 2. In this example, the video data is high-definition video data.

Example 4 includes the features of any one of Examples 1 to 3. In this example, the predetermined frequency pattern is in a frequency range that causes vibrations that can be captured by a frame rate of the camera.

Example 5 includes the features of any one of Examples 1 to 4. In this example, determining that the video data is inconsistent with the expected response to the predetermined frequency pattern further comprises: monitoring the video data for a movement of the user; and determining that the movement of the user is not an expected movement.

Example 6 includes the features of any one of Examples 1 to 5. In this example, the at least one speaker communicatively coupled to the computer is a headphone of a headset.

Example 7 includes the features of any one of Examples 1 to 6. In this example, the predetermined frequency pattern is a directional audio cue.

Example 8 includes the features of any one of Examples 1 to 7. In this example, determining that the video data is inconsistent with the expected response to the predetermined frequency pattern further comprises: monitoring the video data for an expression of the user; and determining that the expression of the user is not an expected expression.

Example 9 includes the features of any one of Examples 1 to 8. In this example, the predetermined frequency pattern is an audible cue configured to elicit an emotive response from the user.

Example 10 includes the features of any one of Examples 1 to 9. In this example, the method is performed by one or more computers according to presentation attack detection software that is downloaded to the one or more computers from a remote data processing system.

Example 11 includes the features of any one of Examples 1 to 10. In this example, the method further comprises: metering a usage of the presentation attack detection software; and generating an invoice based on metering the usage.

Example 12 is a system. The system includes one or more computer readable storage media storing program instructions; and one or more processors which, in response to executing the program instructions, are configured to perform a method according to any one of examples 1-11, including or excluding optional features.

Example 13 is a computer program product. The computer program product includes one or more computer readable storage media, and program instructions collectively stored on the one or more computer readable storage media, the program instructions comprising instructions configured to cause one or more processors to perform a method according to any one of examples 1-11, including or excluding optional features.

What is claimed is:

1. A computer-implemented method comprising:
   emitting a predetermined frequency pattern using at least one speaker communicatively coupled to a computer implementing a video-conference, wherein the predetermined frequency pattern induces vibrations in thread filaments;
   collecting, by a camera communicatively coupled to the computer and overlapping with the emitting the predetermined frequency pattern, video data of a user engaged in the video-conference;
   determining, based on a lack of vibrational movement of the thread filaments, that the video data is inconsistent with an expected response to the predetermined frequency pattern; and
   generating an indication that the user engaged in the video-conference is performing a presentation attack.

2. The computer-implemented method of claim 1, wherein determining that the video data is inconsistent with the expected response to the predetermined frequency pattern further comprises:
   magnifying a portion of the video data; and
   detecting a lack of vibrational movement in the magnified portion of the video data.

3. The computer-implemented method of claim 1, wherein the video data is high-definition video data.

4. The computer-implemented method of claim 1, wherein the predetermined frequency pattern is in a frequency range that causes the vibrations in the thread filaments that can be captured by a frame rate of the camera.

5. The method of claim 1, wherein the method is performed by one or more computers according to presentation attack detection software that is downloaded to the one or more computers from a remote data processing system.

6. The method of claim 5, wherein the method further comprises:
   metering a usage of the presentation attack detection software; and
   generating an invoice based on metering the usage.

7. A system comprising:
   one or more computer readable storage media storing program instructions; and
   one or more processors which, in response to executing the program instructions, are configured to perform a method comprising:
   emitting a predetermined frequency pattern using at least one speaker communicatively coupled to a computer implementing a video-conference, wherein the predetermined frequency pattern induces vibrations in thread filaments;
   collecting, by a camera communicatively coupled to the computer and overlapping with the emitting the predetermined frequency pattern, video data of a user engaged in the video-conference;
   determining, based on a lack of vibrational movement of the thread filaments, that the video data is inconsistent with an expected response to the predetermined frequency pattern; and
   generating an indication that the user engaged in the video-conference is performing a presentation attack.

8. The system of claim 7, wherein determining that the video data is inconsistent with the expected response to the predetermined frequency pattern further comprises:
   magnifying a portion of the video data; and
   detecting a lack of vibrational movement in the magnified portion of the video data.

9. The system of claim 7, wherein the video data is high-definition video data.

10. The system of claim 7, wherein the predetermined frequency pattern is in a frequency range that causes the vibrations in the thread filaments that can be captured by a frame rate of the camera.

11. A computer program product comprising one or more computer readable storage media, and program instructions collectively stored on the one or more computer readable storage media, the program instructions comprising instructions configured to cause one or more processors to perform a method comprising:

emitting a predetermined frequency pattern using at least one speaker communicatively coupled to a computer implementing a video-conference, wherein the predetermined frequency pattern induces vibrations in hair;

collecting, by a camera communicatively coupled to the computer and overlapping with the emitting the predetermined frequency pattern, video data of a user engaged in the video-conference;

determining, based on a lack of vibrational movement of the hair, that the video data is inconsistent with an expected response to the predetermined frequency pattern; and generating an indication that the user engaged in the video-conference is performing a presentation attack.

12. The computer program product of claim 11, wherein determining that the video data is inconsistent with the expected response to the predetermined frequency pattern further comprises:

magnifying a portion of the video data; and detecting a lack of vibrational movement in the magnified portion of the video data.

13. The computer program product of claim 11, wherein the video data is high-definition video data.

14. The computer program product of claim 11, wherein the predetermined frequency pattern is in a frequency range that causes the vibrations in the hair that can be captured by a frame rate of the camera.

\* \* \* \* \*